US009065341B2

(12) United States Patent
Murakami et al.

(10) Patent No.: US 9,065,341 B2
(45) Date of Patent: Jun. 23, 2015

(54) DC-DC CONVERTER

(75) Inventors: Satoshi Murakami, Tokyo (JP); Masaki Yamada, Tokyo (JP); Ryota Kondo, Tokyo (JP); Takashi Kaneyama, Tokyo (JP); Kazutoshi Awane, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 55 days.

(21) Appl. No.: 13/980,911

(22) PCT Filed: Nov. 24, 2011

(86) PCT No.: PCT/JP2011/077017
§ 371 (c)(1),
(2), (4) Date: Jul. 22, 2013

(87) PCT Pub. No.: WO2012/105112
PCT Pub. Date: Aug. 9, 2012

(65) Prior Publication Data
US 2013/0301304 A1    Nov. 14, 2013

(30) Foreign Application Priority Data
Feb. 4, 2011    (JP) .................................. 2011-022270

(51) Int. Cl.
H02M 3/335    (2006.01)
(52) U.S. Cl.
CPC .......... *H02M 3/335* (2013.01); *H02M 3/33507* (2013.01)
(58) Field of Classification Search
USPC ........... 363/15, 16, 17, 60, 61, 81, 84, 88, 89, 363/90, 125, 126, 127
See application file for complete search history.

(56) References Cited

U.S. PATENT DOCUMENTS

| 2005/0259451 | A1  | 11/2005 | Mbaye |
| 2009/0091961 | A1* | 4/2009  | Hsia et al. ..................... 363/127 |
| 2012/0008354 | A1* | 1/2012  | Tang ............................. 363/126 |

FOREIGN PATENT DOCUMENTS

| CN | 1635695 A  | 7/2005 |
| JP | 9-224374   | 8/1997 |
| JP | 2004-364456| 12/2004 |
| JP | 2006-352959| 12/2006 |
| JP | 2007 215324| 8/2007 |

OTHER PUBLICATIONS

International Search Report Issued Feb. 14, 2012 in PCT/JP11/77017 Filed Nov. 24, 2011.
Office Action issued Dec. 24, 2014 in Japanese Patent Application No. 2012-555693 (with English translation).
Office Action issued Jan. 14, 2015 in Chinese Patent Application No. 201180066536.8 (with English translation).

* cited by examiner

*Primary Examiner* — Nguyen Tran
(74) *Attorney, Agent, or Firm* — Oblon, McClelland, Maier & Neustadt, L.L.P.

(57) ABSTRACT

A DC-DC converter in which a primary side and a secondary side are insulated by a transformer, includes: two diodes having anodes respectively connected to both ends of a secondary winding of the transformer and cathodes connected to each other; a series circuit composed of a resistor and a capacitor connected in series; and a snubber circuit formed by connecting the cathodes of the diodes to the connection point between the resistor and the capacitor. Surge voltage caused on the secondary side of the transformer is clamped at the voltage of the capacitor, and surge energy stored in the capacitor is regenerated to a load via the resistor. Thus, surge voltage caused on the secondary side of the transformer is suppressed with a simple configuration, and effective use of surge energy is ensured.

9 Claims, 9 Drawing Sheets

DC-DC CONVERTER

TECHNICAL FIELD

The present invention relates to a DC-DC converter in which a primary side and a secondary side are insulated by a transformer, and particularly, to suppression of surge voltage caused upon switching.

BACKGROUND ART

A conventional power conversion apparatus includes an inverter, a high-frequency transformer, and a bidirectional switch, and rectifies, by the bidirectional switch, a positive-and-negative square wave pulse train stepped up by the high-frequency transformer, into a square wave pulse train having a single polarity. Two or more series circuits such as a series circuit composed of a power switch device AS1 and a capacitor C1 and a series circuit composed of a power switch device AS2 and a capacitor C2 connected in a direction opposite to the first one, are connected between both output-side ends of the high-frequency transformer. The power switch devices AS1 and AS2 operate in synchronization with the polarity of output voltage of the high-frequency transformer, thereby clamping surge voltage caused on the output voltage of the transformer, at the voltage of a capacitor C1 or C2 (for example, see Patent Document 1).

CITATION LIST

Patent Document

Patent Document 1: Japanese Laid-Open Patent Publication No. 2007-215324

SUMMARY OF THE INVENTION

Problems to be Solved by the Invention

In the conventional power conversion apparatus, the switching devices are caused to operate in synchronization with the polarity of the output voltage of the transformer, whereby the surge current is stored in the capacitor. Therefore, switching control is needed for suppressing the surge voltage, and there is a limit on simplification of the circuit configuration. In addition, since current discharged from the capacitor flows to the transformer side, use of the stored surge energy is restricted.

The present invention has been made to solve the above problems, and an object of the present invention is to provide a DC-DC converter that suppresses surge voltage caused on a secondary side of a transformer with a simple configuration and ensures that surge energy can be effectively used.

Solution to the Problems

A first DC-DC converter according to the present invention performs DC-DC conversion of inputted DC power and outputting the converted power to a load, and includes: an inverter having a plurality of semiconductor switching devices, for converting DC power to AC power; a transformer having a primary side connected to AC output of the inverter; and a rectification circuit having a plurality of semiconductor devices and connected to a secondary side of the transformer. In addition, the first DC-DC converter includes a snubber circuit having: a series circuit composed of a resistor having one end connected to the positive terminal of the load, and a capacitor having one end connected to the negative terminal of the load, the resistor and the capacitor being connected in series; and two diodes having anodes respectively connected to both ends of a secondary winding of the transformer and cathodes connected to a connection point between the resistor and the capacitor. The snubber circuit suppresses surge voltage caused on the secondary side of the transformer, and regenerates power of the capacitor to the load via the resistor.

Further, a second DC-DC converter according to the present invention performs DC-DC conversion of inputted DC power and outputting the converted power to a load, and includes: an inverter having a plurality of semiconductor switching devices, for converting DC power to AC power; a transformer having a primary side connected to AC output of the inverter; and a rectification circuit having a plurality of semiconductor devices and connected to a secondary side of the transformer. In addition, the second DC-DC converter includes a snubber circuit having: two diodes having anodes respectively connected to both ends of a secondary winding of the transformer and cathodes connected to each other; a capacitor connected between a negative terminal of the load and the connection point between the two diodes; and a step-down chopper circuit composed of a semiconductor switching device to which a diode is connected in antiparallel, a diode, and a reactor, and connected between the capacitor and the load. The snubber circuit suppresses surge voltage caused on the secondary side of the transformer, and regenerates power of the capacitor to the load via the step-down chopper circuit.

Effect of the Invention

According to the above first DC-DC converter, surge voltage caused on the secondary side of the transformer is clamped at the voltage of the capacitor by the diode of the snubber circuit, and stored in the capacitor. Therefore, it is possible to suppress the surge voltage and protect each device of the rectification circuit from overvoltage, with a simple circuit configuration without the need of switching control. In addition, the surge energy stored in the capacitor is regenerated to the output side via the resistor, whereby it is ensured that the surge energy is effectively used.

According to the above first DC-DC converter, surge voltage caused on the secondary side of the transformer is clamped at the voltage of the capacitor by the diode of the snubber circuit, and stored in the capacitor. Therefore, it is possible to suppress the surge voltage and protect each device of the rectification circuit from overvoltage, with a simple circuit configuration without the need of switching control. In addition, the surge energy stored in the capacitor is regenerated to the output side via the step-down chopper circuit, whereby it is ensured that the surge energy is effectively used.

DESCRIPTION OF EMBODIMENTS

Embodiment 1

Hereinafter, embodiment 1 of the present invention will be described.

Figure 1:
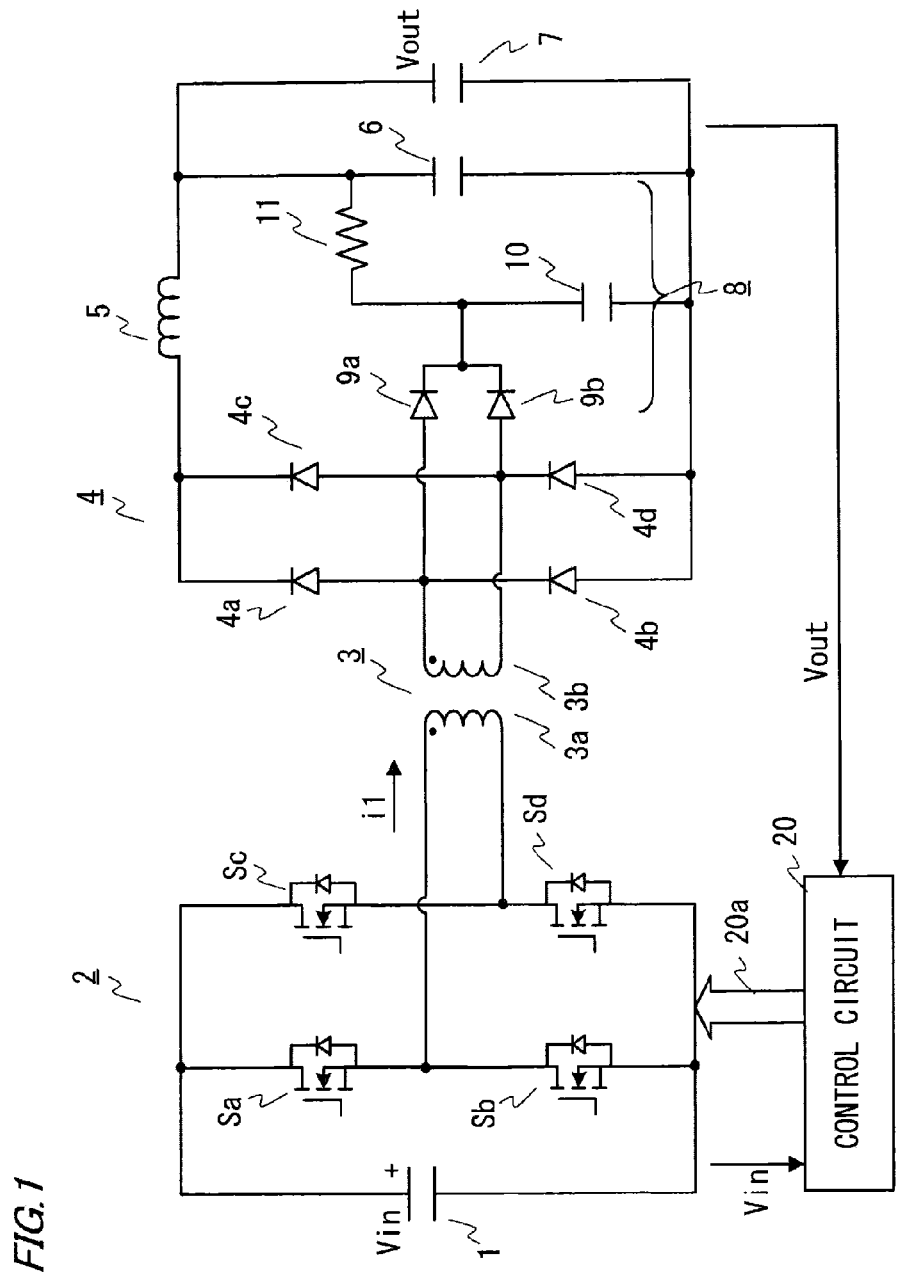
FIG. 1 is a configuration diagram of a DC-DC converter according to embodiment 1 of the present invention.

FIG. 1 is a diagram showing the circuit configuration of a DC-DC converter according to embodiment 1 of the present invention. As shown in FIG. 1, the DC-DC converter converts voltage Vin of a DC power supply 1 to secondary-side DC voltage insulated by a transformer 3, and outputs DC voltage Vout to a load 7 such as a battery, for example.

The DC-DC converter includes: the insulated transformer 3; a single-phase inverter 2 connected to a primary winding 3a of the transformer 3 and having semiconductor switching devices Sa, Sb, Sc, and Sd which are connected in a full-bridge fashion and each of which is composed of a MOSFET (Metal Oxide Semiconductor Field Effect Transistor) including a diode between the source and drain thereof, the single-phase inverter 2 thus serving as an inverter for converting the DC voltage Vin of the DC power supply 1 to AC voltage; and a rectification circuit 4 connected to a secondary winding 3b of the transformer 3 and having diodes 4a to 4d as rectification devices (semiconductor devices) which are connected in a full-bridge fashion. In addition, a reactor 5 for output smoothing and a smoothing capacitor 6 are connected to the output of the rectification circuit 4, and DC voltage Vout is outputted to the load 7.

In addition, the DC-DC converter includes a snubber circuit 8 for suppressing surge voltage caused on the secondary side of the transformer 3, and the snubber circuit 8 includes: diodes 9a and 9b whose anodes are connected to the respective ends of the transformer secondary winding 3b; and a series circuit composed of a capacitor 10 and a resistor 11 connected in series. The cathodes of the two diodes 9a and 9b are connected to each other, and the connection point therebetween is connected to a connection point between the capacitor 10 and the resistor 11. The other end of the resistor 11 is connected to the positive terminal of the smoothing capacitor 6 or the load 7. The negative terminals of the capacitor 10, the smoothing capacitor 6, and the load 7 are connected to each other, and then connected to the anodes of the diodes 4b and 4d of the rectification circuit 4.

Further, a control circuit 20 is provided outside the main circuit, and the input voltage Vin and the output voltage Vout are each monitored and outputted to the control circuit 20. The control circuit 20 outputs a gate signal 20a to the semiconductor switching devices Sa to Sd in the single-phase inverter 2, thereby controlling the ON duty (ON period) of each of the semiconductor switching devices Sa to Sd, so that the output voltage Vout will be target voltage.

It is noted that the semiconductor switching devices Sa to Sd of the single-phase inverter 2 are not limited to a MOSFET. They may be a self-turn-off semiconductor switching device such as an IGBT (Insulated Gate Bipolar Transistor) to which a diode is connected in antiparallel.

The operation of the DC-DC converter configured as described above will be described below.

Figure 2:
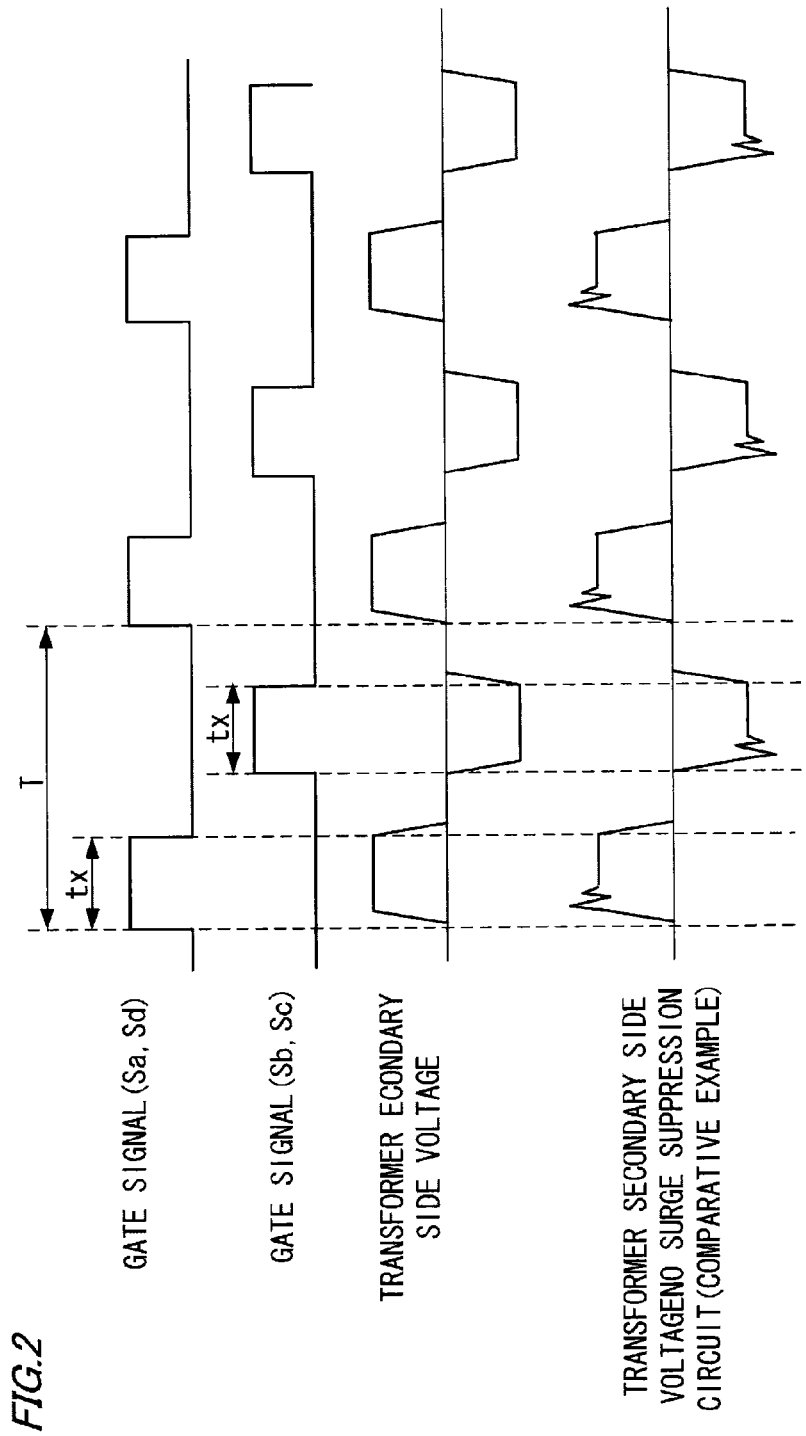
FIG. 2 is a waveform diagram of each section for explaining the operation of the DC-DC converter according to embodiment 1 of the present invention.

FIG. 2 is a waveform diagram showing: as the gate signal 20a, a gate signal for the semiconductor switching devices Sa and Sd and a gate signal for the semiconductor switching devices Sb and Sc; and voltage caused on the transformer secondary side. It is noted that when the gate signal is High, each of the semiconductor switching devices Sa to Sd is turned on.

The single-phase inverter 2 alternately performs an operation of turning on the semiconductor switching devices Sa and Sd at the same time and an operation of turning on the semiconductor switching devices Sb and Sc at the same time, with the same ON duty (ON period) tx. In this period, the transformer 3 transmits power from the primary side to the secondary side, and voltage occurs on the transformer secondary side. When the semiconductor switching devices Sa and Sd are turned on at the same time, current flows through a route shown in FIG. 3, and when the semiconductor switching devices Sb and Sc are turned on at the same time, current flows through a route shown in FIG. 4, whereby power is transmitted to the transformer secondary side.

In order to prevent arm short-circuit, a dead time td is needed between the period when the semiconductor switching devices Sa and Sd are both on and the period when the semiconductor switching devices Sb and Sc are both on. Therefore, if one cycle is denoted by T, the ON duty (tx) is represented as follows.

$$tx \leq T/2 - td$$

In addition, if the turns ratio of the transformer 3 is denoted by n, the output voltage Vout is represented by the following expression, using the input voltage Vin, the ON duty (tx), and the cycle T.

$$Vout = Vin \cdot n \cdot (2tx/T)$$

That is, control is performed such that, in the case of increasing the output voltage Vout, the ON duty (tx) is increased within a range not exceeding (T/2–td), and in the case of decreasing the output voltage Vout, the ON duty (tx) is decreased.

Figure 3:
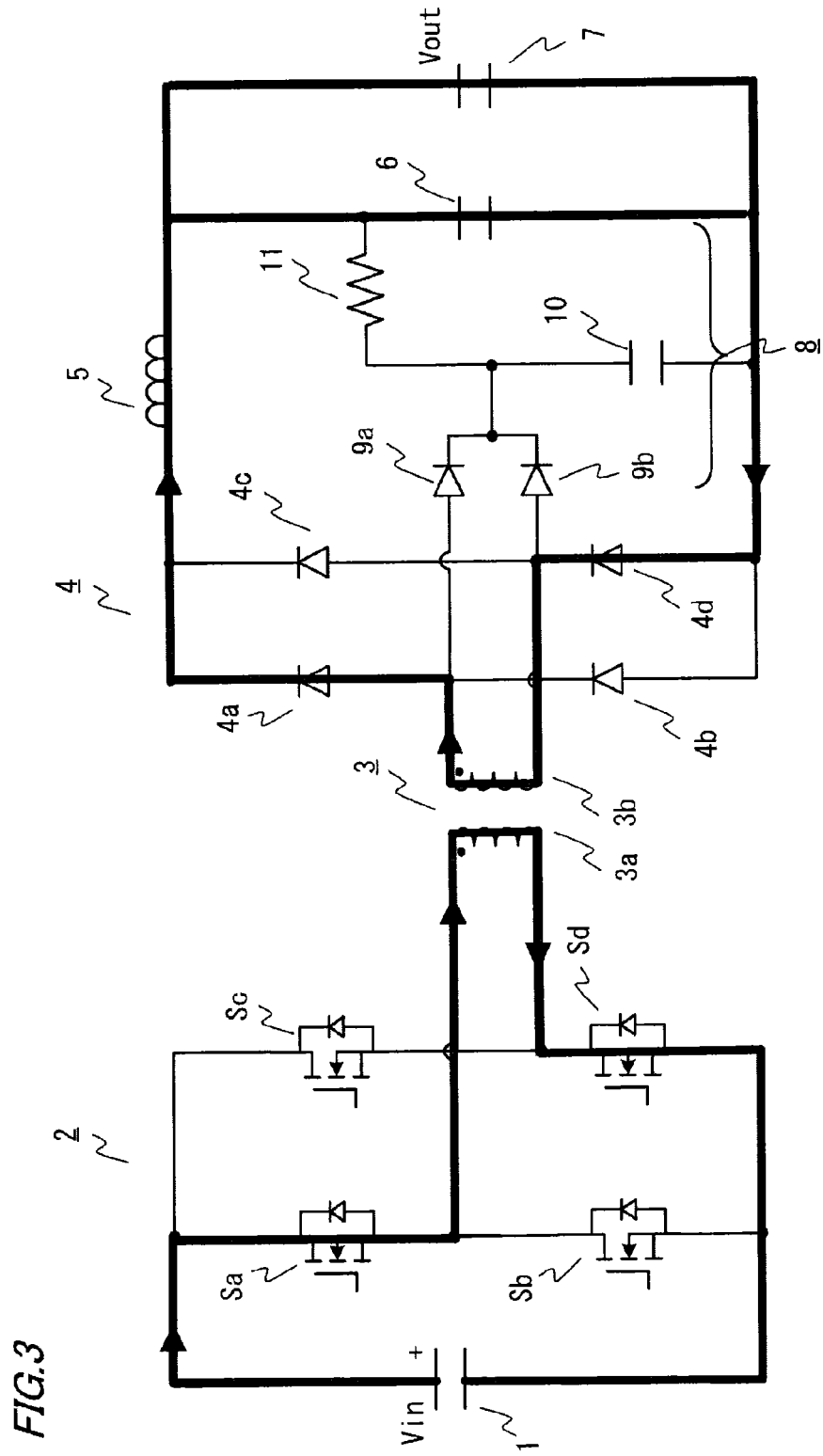
FIG. 3 is a current route diagram for explaining the operation of the DC-DC converter according to embodiment 1 of the present invention.
Figure 4:
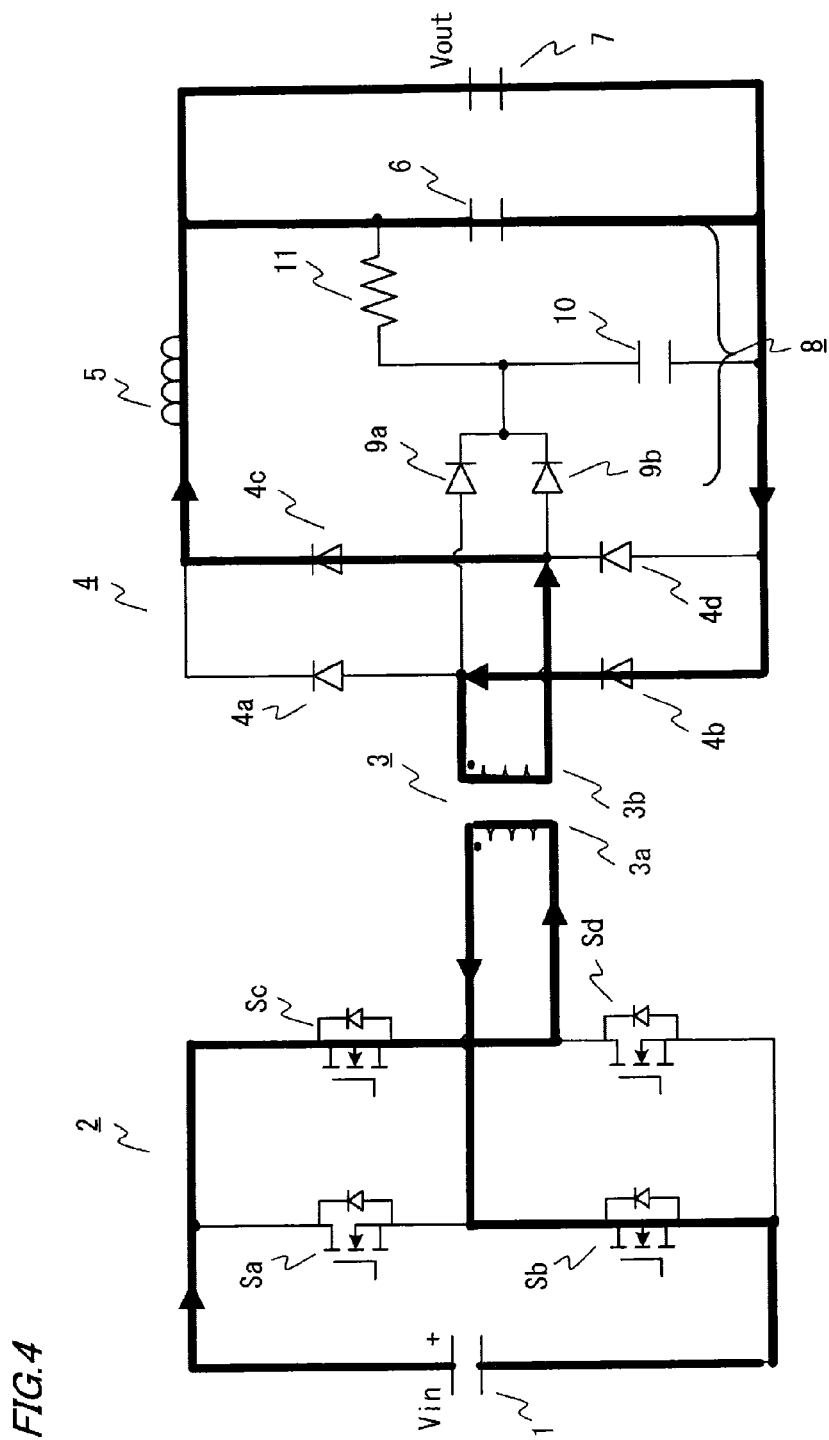
FIG. 4 is a current route diagram for explaining the operation of the DC-DC converter according to embodiment 1 of the present invention.

By alternately performing an operation of turning on the semiconductor switching devices Sa and Sd at the same time and an operation of turning on the semiconductor switching devices Sb and Sc at the same time as described above, current flows with its polarity being inverted between positive and negative, as shown in FIGS. 3 and 4. The snubber circuit 8 provided on the secondary side of the transformer 3 suppresses surge voltage caused on the transformer 3 due to leakage inductance of the transformer 3 or an inductance component of circuitry upon the inversion of current, whereby voltage having a preferable waveform occurs on the transformer secondary side as shown in FIG. 2. It is noted that a voltage waveform in the case where no surge suppression circuit such as the snubber circuit 8 is provided is also shown as a comparative example in FIG. 2. As shown in FIG. 2, in the case where no surge suppression circuit is provided, surge voltage occurs at the time of rising when voltage occurs on the secondary winding of the transformer 3, that is, when the transformer 3 is turned on.

The details of the operation of the snubber circuit 8 will be described below.

When the DC-DC converter is activated, the capacitor 10 is initially charged via the resistor 11 with the voltage Vout smoothed by the reactor 5 and the smoothing capacitor 6. In addition, when the voltage of the capacitor 10 is lower than the secondary side voltage of the transformer 3, current flows from the transformer secondary winding 3b into the capacitor 10 via the diodes 9a and 9b, whereby the capacitor 10 is charged.

When surge voltage has occurred on the secondary side voltage of the transformer 3 so that the resultant voltage has exceeded the voltage of the capacitor 10, surge current flows from the transformer secondary winding 3b into the capacitor 10 via the diodes 9a and 9b, whereby the secondary side voltage of the transformer 3 is clamped at the voltage of the capacitor 10 and the capacitor 10 is charged with the surge current. It is noted that actually, the secondary side voltage of the transformer 3 is equal to voltage obtained by adding the forward voltage of the diodes 9a and 9b to the voltage of the capacitor 10.

Since the capacitor 10 is initially charged via the resistor 11 from the output voltage Vout side when the DC-DC converter is activated, excessive surge current never flows when the transformer 3 is turned on.

In addition, when the voltage of the capacitor 10 has increased by being charged with surge current, power of the capacitor 10 is regenerated to the smoothing capacitor 6 (or the load 7) via the resistor 11.

As described above, in the present embodiment, the snubber circuit 8 composed of the diodes 9a and 9b, the capacitor 10, and the resistor 11 is provided on the secondary side of the transformer 3, so that surge current flows from the transformer secondary winding 3b into the capacitor 10 via the diodes 9a and 9b when surge voltage has occurred. Therefore, surge voltage caused on the secondary side of the transformer 3 is suppressed by being clamped at the voltage of the capacitor 10. As a result, excessive voltage can be prevented from being applied to the diodes 4a to 4d of the rectification circuit 4, whereby the rectification circuit 4 can be protected. In addition, since the diodes 9a and 9b are used instead of switching devices used in the conventional technique, it is possible to suppress surge voltage and protect each device of the rectification circuit 4 with a simple circuit configuration without the need of switching control. In addition, since excessive surge current never flows in the diodes 9a and 9b, devices with small capacities can be used.

Further, since power stored in the capacitor 10 can be regenerated to the smoothing capacitor 6 (or the load 7) via the resistor 11, it is ensured that surge energy caused by surge voltage is regenerated to the load side to be effectively used, whereby the power conversion efficiency of the DC-DC converter can be improved. In addition, since voltage increase in the capacitor 10 is prevented, the suppression effect for surge voltage can be maintained at a high level.

Embodiment 2

Next, embodiment 2 of the present invention will be described.

Figure 5:
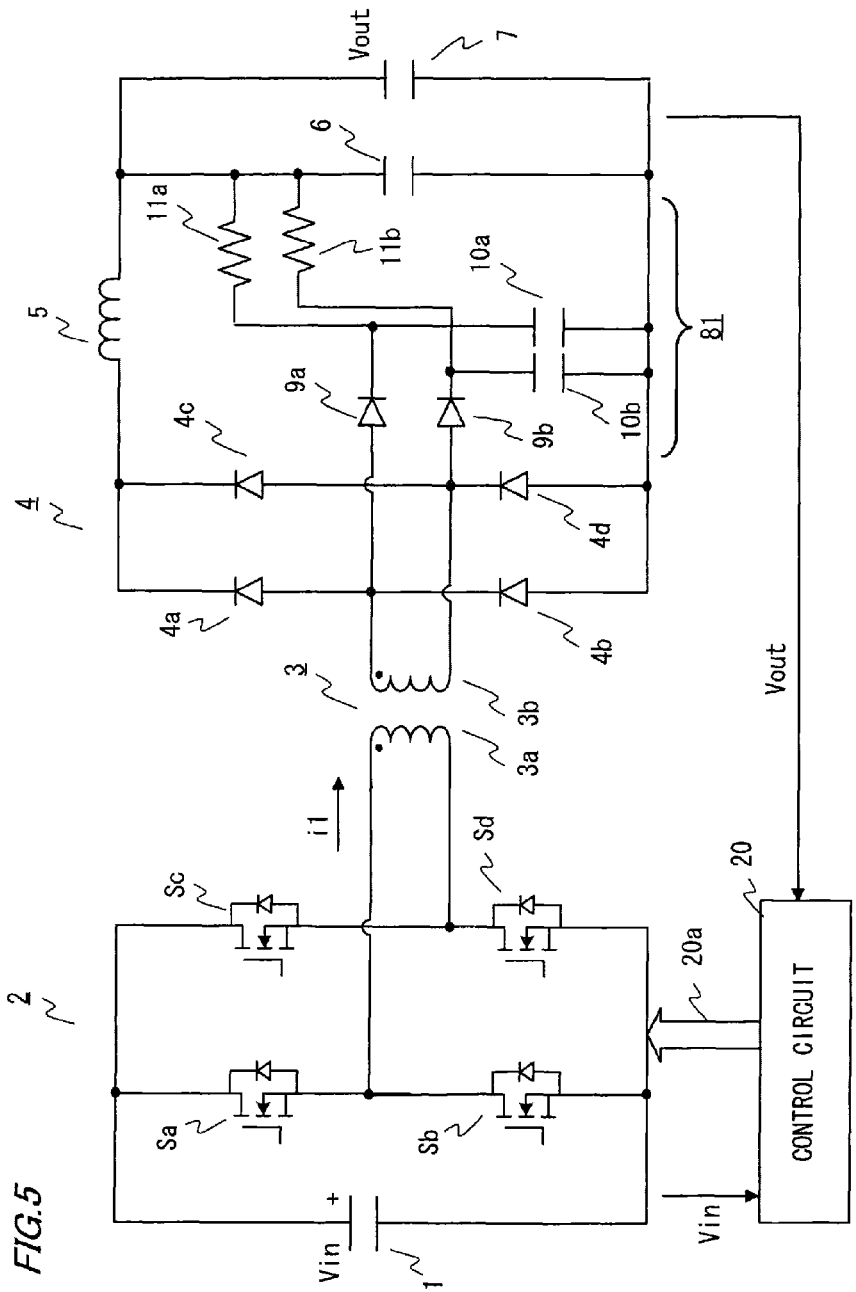
FIG. 5 is a configuration diagram of a DC-DC converter according to embodiment 2 of the present invention.

FIG. 5 is a diagram showing the circuit configuration of a DC-DC converter according to embodiment 2 of the present invention. In the present embodiment, as shown in FIG. 5, a snubber circuit 81 includes: the diodes 9a and 9b whose anodes are connected to the respective ends of the transformer secondary winding 3b; and two series circuits respectively composed of a capacitor 10a and a resistor 11a connected in series and a capacitor 10b and a resistor 11b connected in series. The two series circuits are placed in parallel. The cathodes of the diodes 9a and 9b are respectively connected to the connection point between the capacitor 10a and the resistor 11a and the connection point between the capacitor 10b and the resistor 11b. In addition, the other ends of the resistors 11a and 11b are connected to the positive terminal of the smoothing capacitor 6 or the load 7. The negative terminals of the capacitors 10a and 10b, the smoothing capacitor 6, and the load 7 are connected to each other, and then connected to the anodes of the diodes 4b and 4d of the rectification circuit 4. The configuration other than the snubber circuit 81 is the same as in the above embodiment 1.

Also in the present embodiment, similarly to the above embodiment 1, the snubber circuit 81 provided on the secondary side of the transformer 3 suppresses surge voltage caused on the transformer 3 due to leakage inductance of the transformer 3 or an inductance component of circuitry upon the inversion of current. In this case, surge current flowing through the diode 9a from the transformer secondary winding 3b flows into the capacitor 10a, whereby the surge voltage is clamped at the voltage of the capacitor 10a, and surge current flowing through the diode 9b flows into the capacitor 10b, whereby the surge voltage is clamped at the voltage of the capacitor 10b. Thus, as in the above embodiment 1, it is possible to suppress surge voltage and protect the diodes 4a to 4d of the rectification circuit 4 with a simple circuit configuration without the need of switching control. In addition, it is ensured that surge energy stored in the capacitors 10a and 10b is regenerated via the resistors 11a and 11b to the load side, to be effectively used.

In the present embodiment, surge energy caused on the secondary side of the transformer 3 is shared and stored by the two capacitors 10a and 10b in half of the cycle for each. Therefore, voltage increase in the capacitors 10a and 10b is suppressed, whereby surge suppression capability can be improved, and power can be regenerated to the output side with loss on the resistors 11a and 11b being suppressed.

Embodiment 3

Next, embodiment 3 of the present invention will be described.

Figure 6:
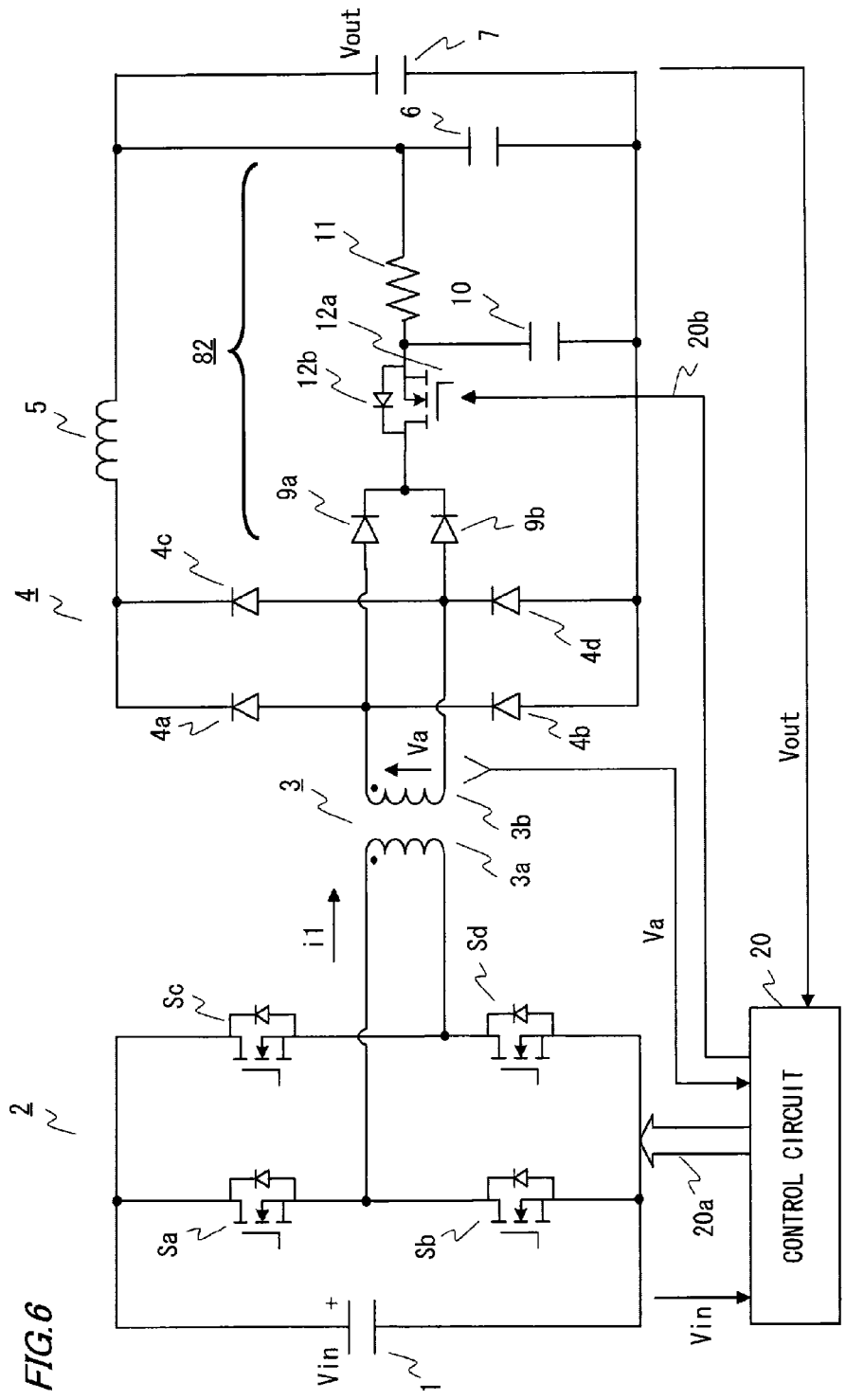
FIG. 6 is a configuration diagram of a DC-DC converter according to embodiment 3 of the present invention.

FIG. 6 is a diagram showing the circuit configuration of a DC-DC converter according to embodiment 3 of the present invention. As shown in FIG. 6, in a snubber circuit 82, the connection point between the cathodes of the two diodes 9a and 9b is connected to the connection point between the capacitor 10 and the resistor 11 via a MOSFET 12a which is a semiconductor switching device. The MOSFET 12a has a diode 12b (in this case, a parasitic diode) connected in anti-parallel and a drain connected to the diodes 9a and 9b side, and functions as current interruption means for interrupting forward current of the diodes 9a and 9b. Instead of the MOSFET 12a, a self-turn-off semiconductor switching device such as an IGBT may be used.

In addition, voltage Va caused on the transformer secondary side is detected and inputted to the control circuit 20, and the control circuit 20 outputs a gate signal 20b based on the detected voltage Va, thereby controlling the MOSFET 12a.

The other configuration is the same as in the above embodiment 1.

In the present embodiment, in the case where the voltage Va caused on the transformer secondary side is lower than predetermined voltage and therefore the breakdown voltage of the diodes 4a to 4d is not influenced even if surge voltage occurs, the MOSFET 12a is turned off to interrupt current flowing through the diodes 9a and 9b. In the case where surge voltage is large, the MOSFET 12a is turned on, so that surge current flows from the transformer secondary winding 3b into the capacitor 10 via the diodes 9a and 9b, whereby the secondary side voltage of the transformer 3 is clamped at the voltage of the capacitor 10 and the capacitor 10 is charged with the surge current. As a result, as well as obtaining the same effect as in the above embodiment 1, loss caused on the capacitor 10 or the resistor 11 can be reduced without unnecessarily causing the snubber circuit 82 to operate.

Although the case where the voltage Va caused on the transformer secondary side is detected for controlling the MOSFET 12a has been described above, the following configuration may be employed. That is, also in the case where current flowing in the secondary winding 3b is small or in the case where the input voltage Vin from the DC power supply 1 is low, the breakdown voltage of the diodes 4a to 4d is not influenced even if surge voltage occurs. Therefore, the current flowing in the secondary winding 3b or the input voltage Vin may be detected, whereby the MOSFET 12a may be turned off. It is noted that as the input voltage Vin in this case, the one detected for controlling the single-phase inverter 2 can be used.

In the above embodiment, the MOSFET 12a is connected to the connection point between the cathodes of the two diodes 9a and 9b, thereby interrupting current flowing through the diodes 9a and 9b. However, the current interruption means may have a configuration other than the above. For example, current may be interrupted on the anode side of the diodes.

Further, the present embodiment can be also applied to the above embodiment 2. In this case, two MOSFETs 12a each having the diode 12b connected in antiparallel are provided, and respectively connected between: the diodes 9a and 9b; and the capacitors 10a and 10b and the resistors 11a and 11b.

Embodiment 4

Next, embodiment 4 of the present invention will be described.

Figure 7:
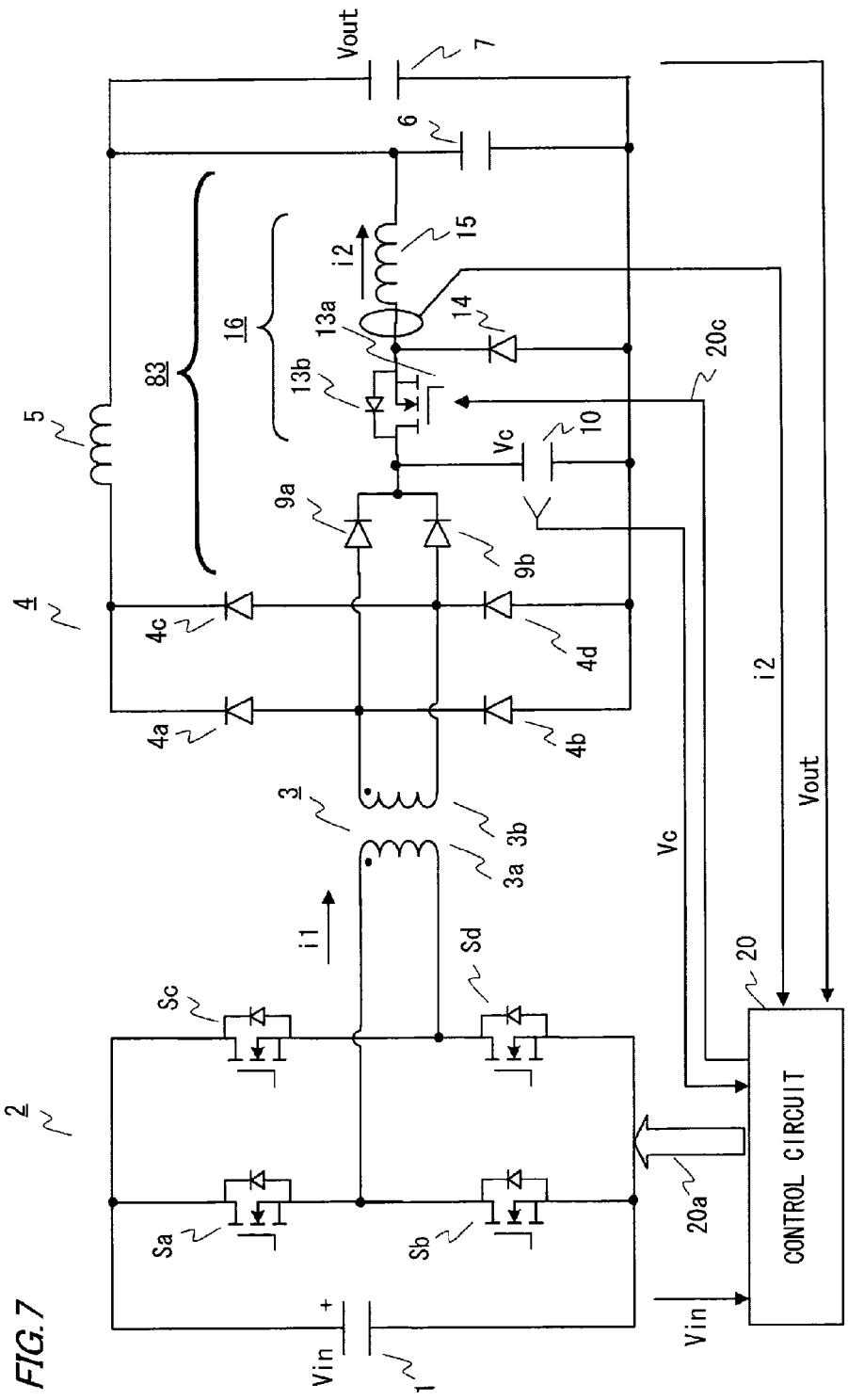
FIG. 7 is a configuration diagram of a DC-DC converter according to embodiment 4 of the present invention.

FIG. 7 is a diagram showing the circuit configuration of a DC-DC converter according to embodiment 4 of the present invention. As shown in FIG. 7, instead of the resistor 11 of the above embodiment 1, a snubber circuit 83 has a step-down chopper circuit 16 composed of: a MOSFET 13a as a semiconductor switching device, to which a diode 13b is connected in antiparallel; a diode 14; and a reactor 15. The drain of the MOSFET 13a and the capacitor 10 are connected, and the connection point therebetween is connected to a connection point between the cathodes of the two diodes 9a and 9b. In addition, the other end of the reactor 15 is connected to the positive terminal of the smoothing capacitor 6 or the load 7. The negative terminals of the capacitor 10, the anode of the diode 14, the smoothing capacitor 6, and the load 7 are connected to each other, and then connected to the anodes of the diodes 4b and 4d of the rectification circuit 4.

In addition, voltage Vc of the capacitor 10 and a current value i2 flowing in the reactor 15 are detected and inputted to the control circuit 20, and the control circuit 20 outputs a gate signal 20c based on the detected voltage Vc and current value i2, thereby controlling the MOSFET 13a of the step-down chopper circuit 16. Instead of the MOSFET 12a, a self-turnoff semiconductor switching device such as an IGBT may be used.

The other configuration is the same as in the above embodiment 1.

In the present embodiment, similarly to the above embodiment 1, when surge voltage has occurred on the secondary side voltage of the transformer 3 so that the resultant voltage has exceeded the voltage of the capacitor 10, surge current flows from the transformer secondary winding 3b into the capacitor 10 via the diodes 9a and 9b, whereby the secondary side voltage of the transformer 3 is clamped at the voltage of the capacitor 10 and the capacitor 10 is charged with the surge current.

Figure 8:
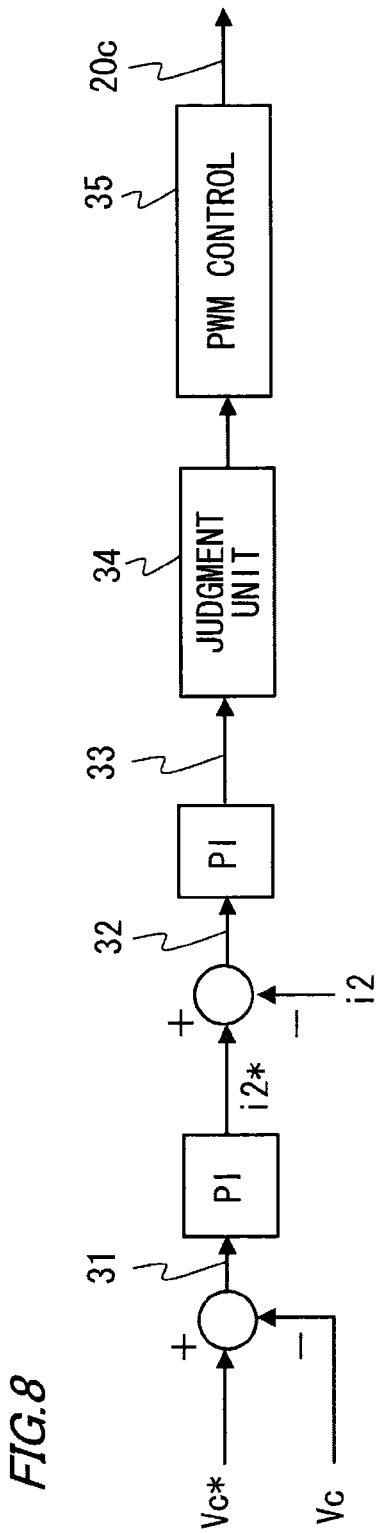
FIG. 8 is a control block diagram showing control by a step-down chopper circuit according to embodiment 4 of the present invention.

The voltage Vc of the capacitor 10 is controlled to be target voltage Vc* by the step-down chopper circuit 16. Hereinafter, the control by the step-down chopper circuit 16 will be described based on FIG. 8.

PI calculation is performed using, as a feedback amount 31, the difference between the predetermined target voltage Vc* and the detected voltage Vc of the capacitor 10, whereby a current instruction value i2* is obtained. Then, a signal 33 obtained by PI calculation using a deviation 32 between the current instruction value i2* and the detected current value i2 of the reactor 15 is judged by a judgment unit 34. Then, based on the judgment, a PWM control unit 35 generates and outputs the gate signal 20c to the MOSFET 13a.

The judgment unit 34 performs judgment such that, when the voltage Vc of the capacitor 10 is lower than the output voltage Vout, the MOSFET 13a is turned off, and when the voltage Vc of the capacitor 10 is equal to or higher than the output voltage Vout, the MOSFET 13a is controlled by PWM control, to perform step-down operation.

In the present embodiment, similarly to the above embodiment 1, surge voltage caused on the secondary side of the transformer 3 is suppressed by being clamped at the voltage of the capacitor 10. As a result, excessive voltage can be prevented from being applied to the diodes 4a to 4d of the rectification circuit 4, whereby the rectification circuit 4 can be protected. In addition, since the diodes 9a and 9b are used instead of switching devices used in the conventional technique, it is possible to suppress surge voltage and protect each device of the rectification circuit 4 with a simple circuit configuration without the need of switching control. In addition, since excessive surge current never flows in the diodes 9a and 9b, devices with small capacities can be used.

Further, since power of the capacitor 10 can be regenerated to the smoothing capacitor 6 (or the load 7) via the step-down chopper circuit 16, it is ensured that surge energy caused by surge voltage is regenerated to the load side to be effectively used. In this case, loss is reduced as compared to the case of using the resistor 11, whereby effective use of the surge energy can be promoted and the power conversion efficiency of the DC-DC converter can be improved. In addition, since the voltage Vc of the capacitor 10 is controlled by the step-down chopper circuit 16, voltage increase in the capacitor 10 can be more suppressed, whereby the suppression effect for the surge voltage can be enhanced.

Embodiment 5

Next, embodiment 5 of the present invention will be described.

Figure 9:
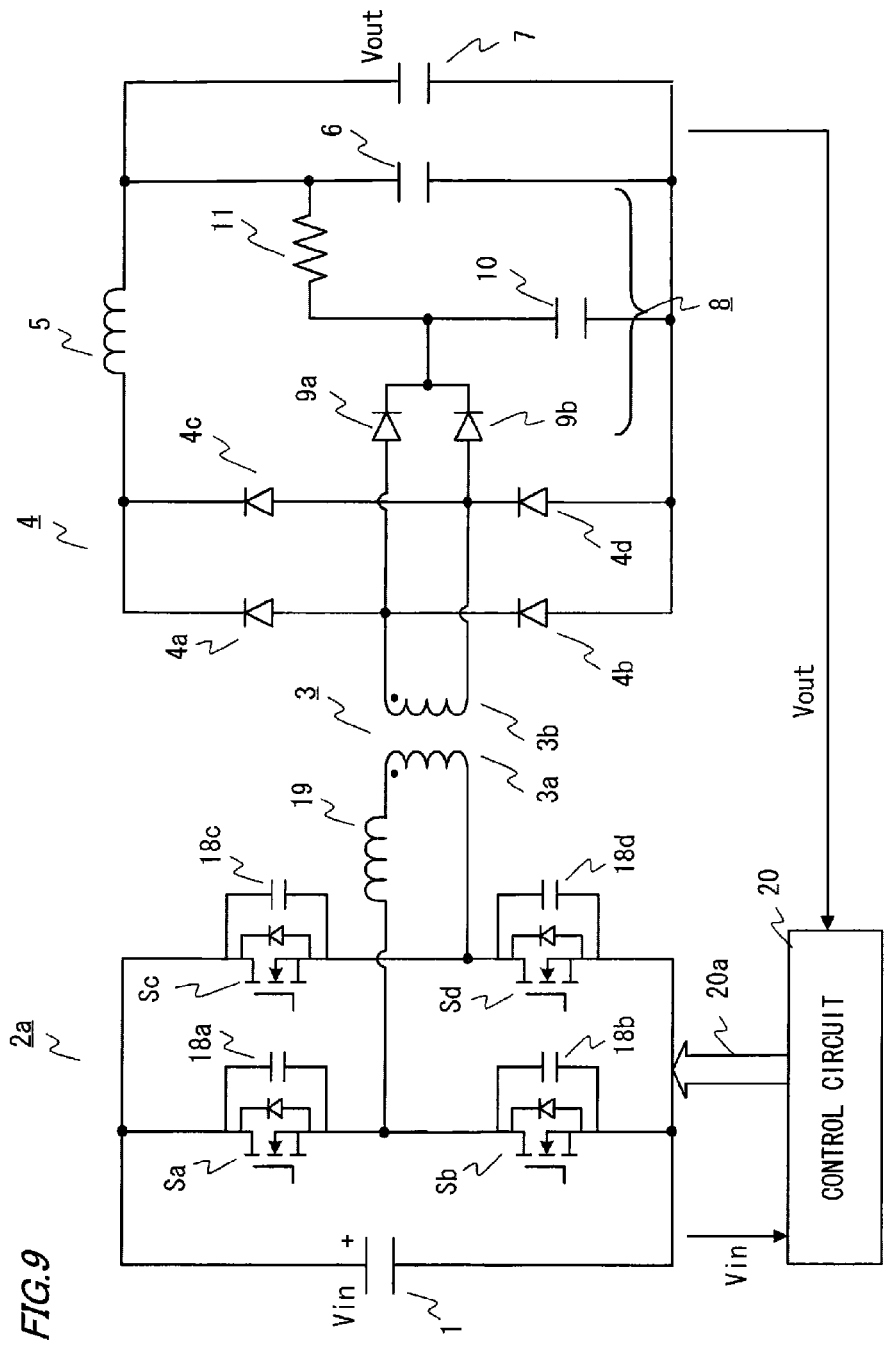
FIG. 9 is a configuration diagram of a DC-DC converter according to embodiment 5 of the present invention.

FIG. 9 is a diagram showing the circuit configuration of a DC-DC converter according to embodiment 5 of the present invention. As shown in FIG. 9, a single-phase inverter 2a which is a zero-voltage switching circuit is used as an inverter for converting the DC voltage Vin of the DC power supply 1 to AC voltage.

The single-phase inverter 2a is a zero-voltage switching circuit that can cause voltage between both ends of each of the semiconductor switching devices Sa to Sd to be substantially zero upon switching thereof, and capacitors 18a to 18d are connected in parallel to the semiconductor switching devices Sa to Sd, respectively. In addition, a resonance reactor 19 is connected on an AC output line between the semiconductor switching devices Sa to Sd and the transformer 3.

In addition, the control circuit 20 generates and outputs the gate signal 20a to the semiconductor switching devices Sa to Sd in the single-phase inverter 2a so as to cause the semiconductor switching devices Sa to Sd to perform zero-voltage switching. The other configuration is the same as in the above embodiment 1.

As described above, surge voltage occurs on the transformer 3 due to leakage inductance of the transformer 3 or an inductance component of circuitry upon the inversion of current. In the single-phase inverter 2a, since the capacitors 18a to 18d and the resonance reactor 19 are provided on the transformer primary side, the surge voltage becomes large. In this case, owing to the snubber circuit 8 shown in the above embodiment 1, it is possible to suppress the surge voltage and protect each device of the rectification circuit 4 with a simple circuit configuration without the need of switching control, while it is ensured that surge energy is regenerated to the load side to be effectively used. Thus, by using the snubber circuit 8 together with the zero-voltage switching circuit in which switching loss is substantially zero, the power conversion efficiency can be more enhanced and the reliability can be also improved.

It is noted that although the snubber circuit 8 of the above embodiment 1 is used in the above case, the snubber circuits 81 to 83 of the above embodiments 2 to 4 can be also applied, whereby the same effect can be obtained.

It is noted that, within the scope of the present invention, the above embodiments may be freely combined with each other, or each of the above embodiments may be modified or abbreviated as appropriate.

The invention claimed is:

1. A DC-DC converter for performing DC-DC conversion of inputted DC power and outputting the converted power to a load, the DC-DC converter comprising:
   an inverter having a plurality of semiconductor switching devices, for converting DC power to AC power;
   a transformer having a primary side connected to AC output of the inverter;
   a rectification circuit having a plurality of semiconductor devices and connected to a secondary side of the transformer; and
   a snubber circuit including:
       a series circuit composed of a resistor having one end connected to the positive terminal of the load, and a capacitor having one end connected to the negative terminal of the load, the resistor and the capacitor being connected in series; and
       two diodes having anodes respectively connected to both ends of a secondary winding of the transformer and cathodes connected to a connection point between the resistor and the capacitor,
   wherein the snubber circuit suppresses surge voltage caused on the secondary side of the transformer, and regenerates power of the capacitor to the load via the resistor.

2. The DC-DC converter according to claim 1, wherein the cathodes of the two diodes are connected to each other, and the connection point therebetween is connected to the connection point between the resistor and the capacitor.

3. The DC-DC converter according to claim 1, wherein two of the series circuits are provided in parallel, and the series circuits are respectively connected to the cathodes of the diodes.

4. The DC-DC converter according to claim 1, further comprising:
   means for detecting one of the values of input voltage of the inverter, voltage of the transformer, and current of the transformer; and
   current interruption means for interrupting forward current of each diode of the snubber circuit,
   wherein the forward current of each diode is interrupted based on the detected value.

5. The DC-DC converter according to claim 4, wherein a semiconductor switching device to which a diode is connected in antiparallel is connected between the cathodes of the diodes and the connection point of the series circuit, thereby forming the current interruption means.

6. The DC-DC converter according to claim 1, wherein the inverter includes: capacitors respectively connected in parallel to the semiconductor switching devices; and a reactor connected on an AC output line, whereby the semiconductor switching devices perform zero-voltage switching operations.

7. A DC-DC converter for performing DC-DC conversion of inputted DC power and outputting the converted power to a load, the DC-DC converter comprising:
   an inverter having a plurality of semiconductor switching devices, for converting DC power to AC power;
   a transformer having a primary side connected to AC output of the inverter;
   a rectification circuit having a plurality of semiconductor devices and connected to a secondary side of the transformer; and
   a snubber circuit including:
       two diodes having anodes respectively connected to both ends of a secondary winding of the transformer and cathodes connected to each other;
       a capacitor connected between a negative terminal of the load and the connection point between the two diodes; and
       a step-down chopper circuit composed of a semiconductor switching device to which a diode is connected in antiparallel, a diode, and a reactor, and connected between the capacitor and the load,
   wherein the snubber circuit suppresses surge voltage caused on the secondary side of the transformer, and regenerates power of the capacitor to the load via the step-down chopper circuit.

8. The DC-DC converter according to claim 7, further comprising: means for detecting voltage of the capacitor, wherein the step-down chopper circuit operates so that the voltage of the capacitor will become predetermined voltage.

9. The DC-DC converter according to claim 7, wherein the inverter includes: capacitors respectively connected in parallel to the semiconductor switching devices; and a reactor connected on an AC output line, whereby the semiconductor switching devices perform zero-voltage switching operations.

* * * * *